United States Patent [19]

Mönch

[11] Patent Number: 4,777,552
[45] Date of Patent: Oct. 11, 1988

[54] TAPE TRANSPORT MECHANISM

[75] Inventor: Peter Mönch, Transvaal Province, South Africa

[73] Assignee: Signal Design Laboratories Limited, Geneva, Switzerland

[21] Appl. No.: 91,201

[22] Filed: Aug. 31, 1987

[30] Foreign Application Priority Data

Sep. 2, 1986 [ZA] South Africa .......... 86/6654

[51] Int. Cl.⁴ .......... G11B 5/54; G11B 21/12; G11B 21/22
[52] U.S. Cl. .......... 360/105
[58] Field of Search .......... 360/105

[56] References Cited

U.S. PATENT DOCUMENTS

| | | | |
|---|---|---|---|
| 4,351,009 | 9/1982 | Osada et al. | 360/105 |
| 4,399,475 | 8/1983 | Shimomae | 360/105 |
| 4,403,265 | 9/1983 | Okada et al. | 360/105 |
| 4,404,606 | 9/1983 | Watanabe | 360/105 |
| 4,460,932 | 7/1984 | Osanai | 360/105 |
| 4,523,241 | 6/1985 | Ito et al. | 360/105 |

*Primary Examiner*—Robert S. Tupper
*Attorney, Agent, or Firm*—Michael N. Meller

[57] ABSTRACT

A tape transport mechanism 10 includes a base member 12 which defines a slot 24. A plate 14 carrying recording and/or playback heads 15 thereon is slidably mounted on the base member 12 over the slot 24. The mechanism 10 includes a substantially wedge-shaped displacement means 16 pivotally mounted within the slot 24. The displacement means carries a pair of rollers 22.1, 22.2, and is pivotal through a predetermined arc of travel by means of a motor and gearbox combination 28. The rollers 22.1 and 22.2 are engageable with spigot formations 44 which project from extensions 42.1, 42.2 extending from the plate 14 into the slot 24. When the plate 14 is in its operative position in which the heads 15 engage a cassette tape, the spigot formation 44 of the extension 42.1 engages the roller 22.1 by a predetermined amount beyond top dead center positively to lock the plate 14 in its operative position.

14 Claims, 2 Drawing Sheets

TAPE TRANSPORT MECHANISM

FIELD OF THE INVENTION

THIS INVENTION relates to a tape recorder. More particularly, the invention relates to a tape transport mechanism for a cassette tape recorder.

BACKGROUND OF THE INVENTION

The Applicant is aware of various tape transport mechanisms having an operating plate, or the like, carrying recording and/or playback heads into an operative position in which the heads engage a recording tape and an inoperative position in which the heads are out of engagement with the tape. Examples of these mechanisms are shown in U.S. Pat. Nos. 4,393,426 to Nakanishi, 4,399,475 to Shimomae, 4,404,606 to Watanabe, 4,523,241 to Ito et al and D. E. "Offenlengungsschrift" 28 02. 232 to LENCO AG. All the arrangements shown in these patents make use of cam and follower mechanisms to move the operating plate, or the like relative to a base member. Some of these arrangements also make use of solenoids to lock the operating plate, or the like, in its operative position. Various problems are associated with these arrangements. For example, cam mechanisms cannot be subjected to very high forces and hence, in certain applications they cannot be used. Also, with the solenoids their power consumption is high. Heat dissipation can also be a problem with such mechanisms and, hence, their range of applications is limited.

SUMMARY OF THE INVENTION

According to the invention, there is provided a tape transport mechanism for a cassette tape recorder, the mechanism including a base member having a guide means;

a plate slidably mounted on one surface of the base member, the plate being slidable on the base member between an operative position in which recording or playback heads carried on an operatively upper surface of the plate are in engagement with a cassette tape, in use, and an inoperative position in which the heads are out of engagement with the cassette tape, the plate including a locating means which co-operates with the guide means of the base member for locating and guiding the plate relative to the base member, the locating means being arranged on the plate on a surface thereof opposite the surface on which the heads are mounted;

a displacement means which includes a subtantially wedge-shaped element pivotally mounted about an apex thereof on the base member, and an engagement means which is engageable with the locating means of the plate for slidably displacing the plate between its operative and inoperative positions; and a locking means carried by the locating means of the plate, the locking means, in use, being engageable with the engagement means at least when the plate is in its operative position for locking the plate in its said operative position.

The guide means may be in the form of an elongate slot formed in the base member, and the plate may be mounted on the base member above the slot. The slot may be enlarged at a substantially central region thereof, with the displacement means being mounted in the said enlarged region of the slot.

The wedge-shaped element may have a wider edge opposed from its apex, with the element being mounted within the enlarged region of the slot so that when the wedge-shaped element pivots, the wider edge thereof can clear a side wall of the base member defining the slot.

The engagement means may include at least one roller element rotatably mounted on the wedge-shaped element adjacent the wider edge of the wedge-shaped element, the roller element being engageable with the locking means of the plate. Preferably, the engagment means may include two roller elements which are mounted in spaced relationship adjacent the wider edge of the wedge-shaped element.

The mechanism may include a drive means for driving the wedge-shaped element of the displacement means, the drive means including a motor and gearbox combination mounted on a surface of the base member opposite the surface thereof on which the plate is mounted, with an output shaft of the motor and gearbox combination projecting into the slot, the wedge-shaped element being mounted on the shaft so that the axis of the shaft defines a pivotal axis about which the wedge-shaped element pivots.

The locating means of the plate may include a pair of aligned spaced extensions which project into the slot of the base.

The locking means may include a detent means located in each extension of the plate, each detent means being engageable with one of the roller elements of the displacement means.

Each detent means may include a spigot formation biassed by a bias means to project out of its associated extension of the plate to engage one of the roller elements of the engagement means, the spigot formation engaging the periphery of the roller element by a predetermined amount beyond top dead centre of the roller element when the plate is either in its operative or inoperative position, thereby to urge the roller element into abutment with a portion of the side wall of the base member which defines the slot, to lock the plate positively in its operative or inoperative position, as the case may be. The bias means may be a coil spring housed within the extension.

The motor and gearbox combination may drive the displacement means through a predetermined arc of travel, and the mechanism may include a sensing means for sensing and limiting the travel of the displacement means. The arc of travel of the displacement means may be about 120°.

The displacement means may include a pin projecting from the wedge-shaped element adjacent the wider edge thereof, the pin projecting through an arcuate aperture in a floor of the slot of the base member, and the sensing means may include a pair of limit switches mounted at opposed ends of the arcuate aperture, the limit switches being connected to the motor of the motor and gearbox combination, and being engageable by the pin of the displacement means to stop the motor when the wedge-shaped element has reached the end of the arc through which it is pivotable.

The invention is now described by way of an example with reference to the accompanying diagrammatic drawings.

DETAILED DESCRIPTION OF THE DRAWINGS

Figure 1:
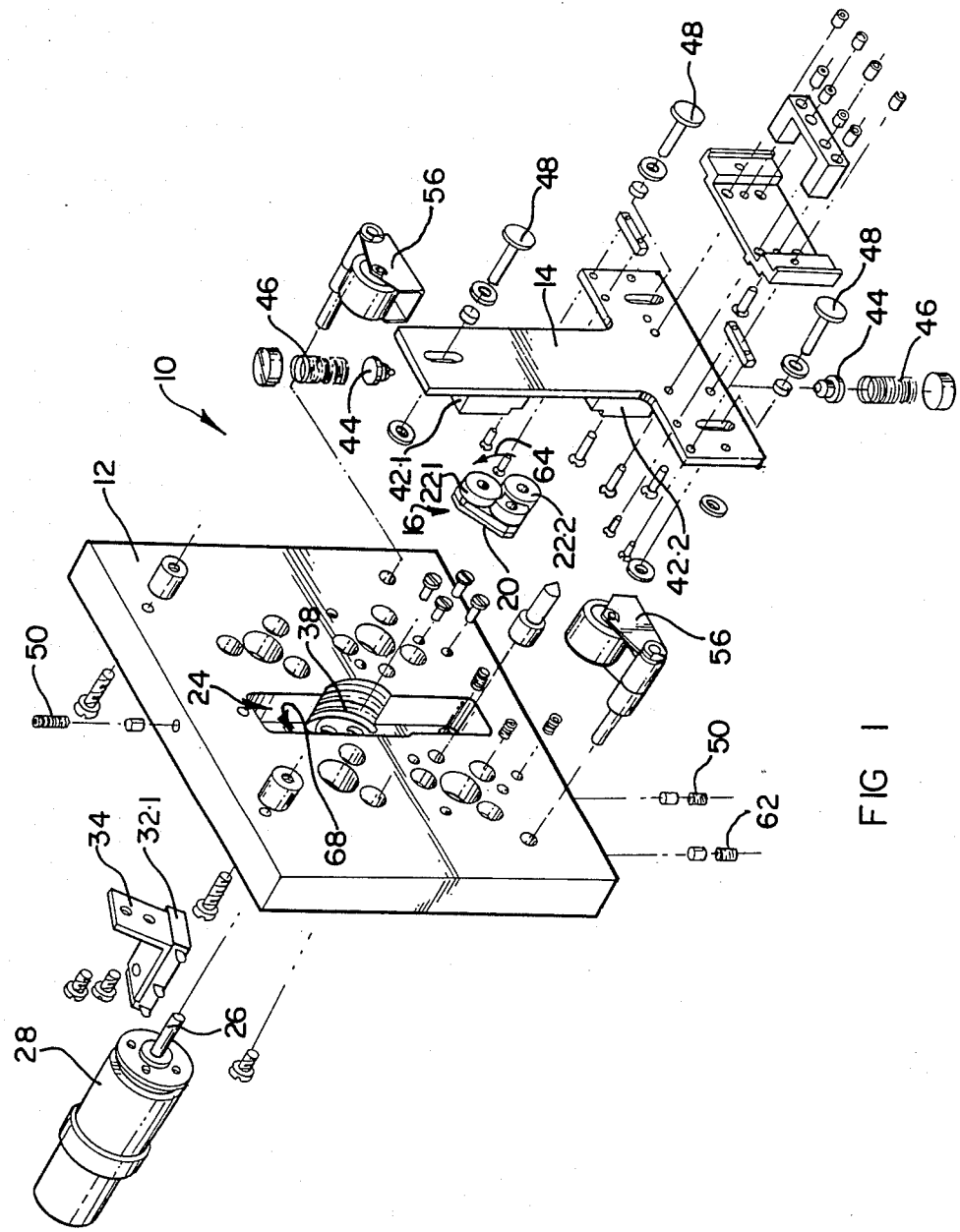
FIG. 1 shows an exploded view of a tape transport mechanism in accordance with the invention.

Referring to the drawings, a tape transport mechanism for a tape recorder is designated generally by the reference numeral 10. The tape transport mechanism 10 includes a base member 12, on which a plate 14 is slidably mounted. The plate 14 supports recording and/or playback heads 15 of the tape recorder.

The tape transport mechanism 10 further includes a displacement means 16 for displacing the plate 14 slidably along the base member 12 between an operative position in which the heads 15 are in engagement with a cassette tape (not shown) and an inoperative position in which the heads 15 are out of engagement with the tape.

The tape transport mechanism 10 further includes a locking means 18 (FIG. 2) responsive to the displacement means 16 for locking the plate 14 in its operative and inoperative positions.

The displacement means 16 includes a substantially wedge-shape element 20 on which an engagement means in the form of a pair of roller elements, or rollers, 22.1 and 22.2 are rotatable mounted. The element 20 with its associated rollers 22.1 and 22.2 is located within a guide means in the form of a slot 24 defined within the base member 12.

The wedge-shape element 20 is mounted on an output shaft 26 of a motor and gearbox combination 28 which drives the wedge-shape element 20 through a predetermined arc of travel of about 120°. The motor and gearbox combination 28 is mounted on a surface 30 of the base member 12 opposite the surface on which the plate 14 is slidably mounted.

Sensing means, in the form of a pair of limit switches 32.1 and 32.2 are mounted via brackets 34 on the surface 30 of the base member 12 at opposite ends of the arc of travel of the wedge-shape element 20. The limit switches 32.1 and 32.2 are electrically connected to the motor and gearbox combination 28 to stop the motor of the combination 28 when the wedge-shape element 20 has reached the end of the arc of travel through which it is pivotable. Each limit switch 32.1, 32.2 includes an operating member 40, which is engageable by a pin 36 which projects from the wedge-shape element 20 through an arcuate aperture 38 in a floor of the slot 24 when the wedge-shape element 20 has reached the end of the arc of travel through which it is pivotable.

The plate 14 includes a pair of longitudinally spaced aligned extensions or housings 42.1 and 42.2 which project into the slot 24 of the base member 12.

The locking means 18 includes a detent means in the form of a spigot formation 44 located within each housing 42.1 and 42.2 of the plate 14. Each spigot formation 44 is biassed by means of a coil spring 46 to project out of the housing to engage one of the rollers 22.1 or 22.2 of the displacement means 16.

The plate 14 is slidably retained in position on the base member 14 by means of a plurality of pins 48. The pins 48 are held in place in the base member 12 by means of grub screws 50.

The tape transport mechanism 10 further includes a conventional pair of hub drive means 52 which are each driven by a motor 54, as well as conventional pinch rollers 56 and capstans 58 (FIG. 2), each capstan 58 being driven by a motor 60. The pinch rollers 56 are also secured to the base member 12 by means of grub screws 62.

Figure 2:
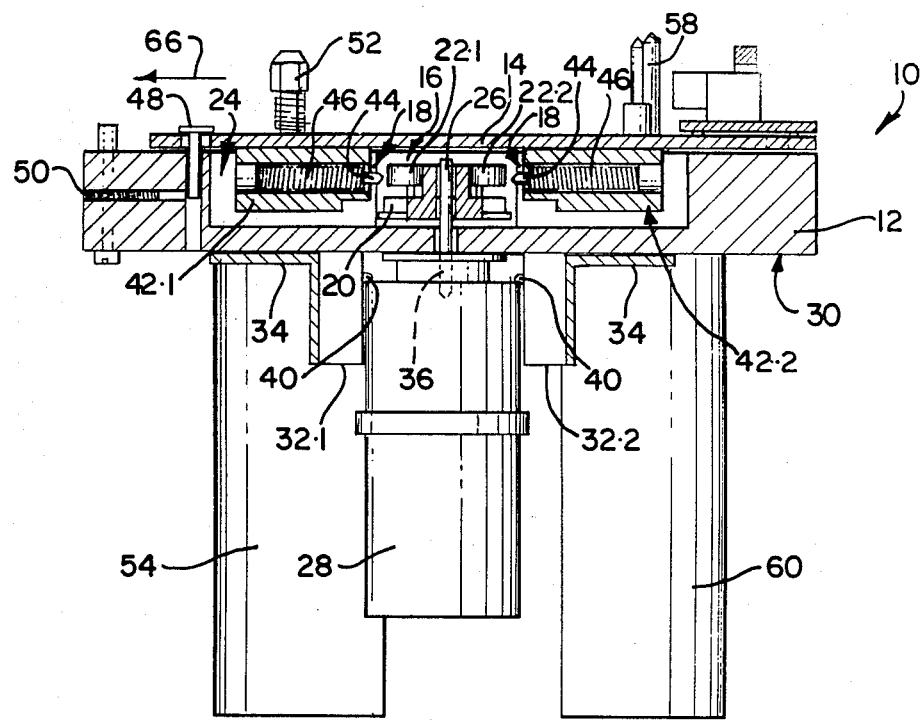
FIG. 2 shows a sectional side view of the tape transport mechanism of FIG. 1.
Figure 3:
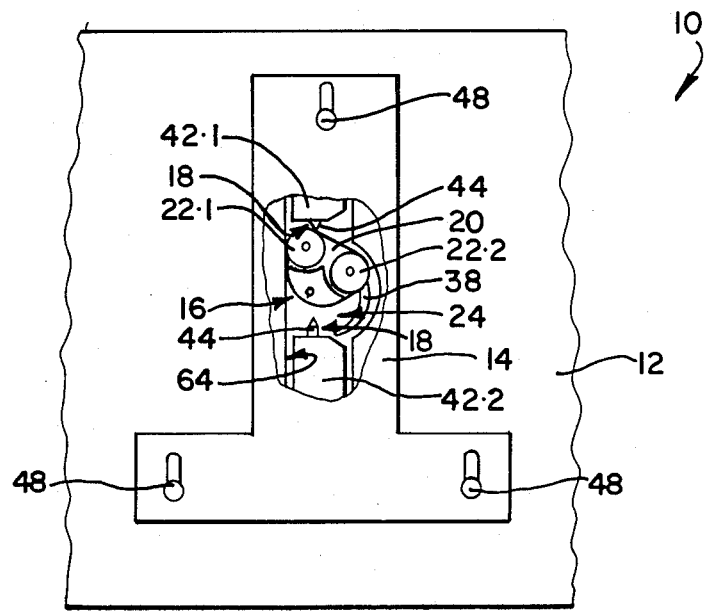
FIG. 3 shows a plan view of part of the mechanism, in its operative position, with portions thereof broken away.

In use, to move the plate 14 into its operative position in which the heads 15 engage a cassette tape, the motor and gearbox combination 28 is energised causing the wedge-shape element 20 of the displacement means 16 to pivot in the direction of arrow 64 (FIG. 1). The roller 22.1 then engages the spigot formation 44 of the housing 42.1 and urges the plate 14 in the direction of arrow 66 (FIG. 2). As the wedge-shape element 20 reaches the end of its arc of travel, the pin 36 projecting through the aperture 38 of the slot 24 engages the operating member 40 of the limit switch 32.1. The limit switch 32.1 is then operated to de-energise the motor of the motor and gearbox combination 28. To lock the plate 14 positively in its operative position, the spigot formation 44 engages a periphery of the roller 22.1 by a predetermined amount beyond top dead centre of the roller 22.1 thereby urging the roller 22.1 against a side wall 68 of the recess 24 in the base member 12. This is illustrated more clearly in FIG. 3 which shows the plate 14 locked in its operative position. Similarly, to lock the plate 14 in its inoperative position, the wedge-shape element 20 is pivoted in a direction opposite to that of arrow 64 and the roller 22.2 engages the spigot formation 44 in the housing 42.2 of the plate 14. In a similar fashion to that described above, the spigot formation 44 in the housing 42.2 engages a periphery of the roller 22.2 by a predetermined amount beyond top dead centre thereby urging the roller 22.2 into abutment with the side wall 68 of the slot 24, thus locking the plate 14 positively in its inoperative position.

It will be appreciated that by means of the locking configuration of the rollers 22.1, 22.2 and the spigot formations 44, no separate retaining means is required to lock the plate 14 in its operative or inoperative position. Hence, movement of the plate 14 locks the plate 14 automatically when the displacement means 16 reaches the end of the arc of travel through which it is pivotable. Further, to unlock the plate 16, the motor of the motor and gearbox combination needs merely be energised and no separate locking release mechanism is necessary.

It is an advantage of the invention, that by means of the positive locking effected by the displacement means 16 and the locking means 18 on the plate 14, the tape transport mechanism 10 can be subjected to very high forces without the recording of data onto the cassette tape by the heads 15 being adversely affected, the forces which the mechanism 10 can withstand being as high as 50 to 60G's. Also, the power consumption of the motor and gearbox combination 28 is relatively low, the motor and gearbox combination 28 only requiring about 80 to 100 mA for a period of about 0.6 seconds. Another advantage of the invention is that, as opposed to conventional tape transport mechanisms which use solenoids that have to be energised all the time while the recording and/or playback heads are in contact with the cassette tape, the motor and gearbox combination of the tape transport mechanism 10 of the invention is only energised to drive the plate 14 into its operative or inoperative position whereafter it is de-energised. Hence, as opposed to conventional tape transport mechanisms, heat dissipation with the tape transport mechanism 10 of the invention is not a problem, and as a result the mechanism 10 is more compact than other tape transport mechanisms of which the applicant is aware.

I claim:

1. A tape transport mechanism for a cassette tape recorder, the mechanism including a base member having a guide means;

a plate slidably mounted on one surface of the base member, the plate being slidable on the base member between an operative position in which recording or playback heads carried on an operatively upper surface of the plate are in engagement with a cassette tape, in use, and an inoperative position in which the heads are out of engagement with the cassette tape, the plate including a locating means which co-operates with the guide means of the base member for locating and guiding the plate relative to the base member, the locating means being arranged on the plate on a surface thereof opposite the surface on which the heads are mounted;

a displacement means which includes a subtantially wedge-shaped element pivotally mounted about an apex thereof on the base member and an engagement means which is engageable with the locating means of the plate for slidably displacing the plate between its operative and inoperative positions; and a locking means carried by the locating means of the plate, the locking means, in use, being engageable with the engagement means at least when the plate is in its operative position for locking the plate in its said operative position.

2. The mechanism as claimed in claim 1 in which the guide means is in the form of an elongate slot formed in the base member, and in which the plate is mounted on the base member above the slot.

3. The mechanism as claimed in claim 2 in which the slot is enlarged at a substantially central region thereof, with the displacement means being mounted in the said enlarged region of the slot.

4. The mechanism as claimed in claim 3 in which the wedge-shaped element has a wider edge opposed from its apex, with the element being mounted within the enlarged region of the slot so that when the wedge-shaped element pivots, the wider edge thereof can clear a side wall of the base member defining the slot.

5. The mechanism as claimed in claim 4 in which the engagement means includes at least one roller element rotatably mounted on the wedge-shaped element adjacent the wider edge of the wedge-shaped element, the roller element being engageable with the locking means of the plate.

6. The mechanism as claimed in claim 5 in which the engagement means includes two roller elements which are mounted in spaced relationship adjacent the wider edge of the wedge-shaped element.

7. The mechanism as claimed in claim 4 which includes a drive means for driving the wedge-shaped element of the displacement means, the drive means including a motor and gearbox combination mounted on a surface of the base member opposite the surface thereof on which the plate is mounted, with an output shaft of the motor and gearbox combination projecting into the slot, the wedge-shaped element being mounted on the shaft so that the axis of the shaft defines a pivotal axis about which the wedge-shaped element pivots.

8. The mechanism as claimed in claim 6 in which the locating means of the plate includes a pair of aligned spaced extensions which project into the slot of the base.

9. The mechanism as claimed in claim 8 in which the locking means includes a detent means located in each extension of the plate, each detent means being engageable with one of the roller elements of the displacement means.

10. The mechanism as claimed in claim 9 in which each detent means includes a spigot formation biassed by a bias means to project out of its associated extension of the plate to engage one of the roller elements of the engagement means, the spigot formation engaging the periphery of the roller element by a predetermined amount beyond top dead centre of the roller element when the plate is either in its operative or inoperative position, thereby to urge the roller element into abutment with a portion of the side wall of the base member which defines the slot, to lock the plate positively in its operative or inoperative position, as the case may be.

11. The mechanism as claimed in claim 10 in which the bias means is a coil spring housed within the extension.

12. The mechanism as claimed in claim 10 in which the motor and gearbox combination drives the displacement means through a predetermined arc of travel, and in which the mechanism includes a sensing means for sensing and limiting the travel of the displacement means.

13. The mechanism as claimed in claim 12 in which the displacement means includes a pin projecting from the wedge-shaped element adjacent the wider edge thereof, the pin projecting through an arcuate aperture in a floor of the slot of the base member, and in which the sensing means includes a pair of limit switches mounted at opposed ends of the arcuate aperture, the limit switches being connected to the motor of the motor and gearbox combination, and being engageable by the pin of the displacement means to stop the motor when the wedge-shaped element has reached the end of the arc through which it is pivotable.

14. A tape transport mechanism for a cassette tape recorder which includes a base member having an elongate slot formed therein with a substantially central region of the slot being enlarged;

a plate slidably mounted on one surface of the base member above the slot, the plate being slidable between an operative position in which recording or playback heads carried on an operatively upper surface of the plate are in engagement with a cassette tape, in use, and an inoperative position in which the heads are out of engagement with the cassette tape, the plate being elongate and having a pair of aligned spaced extensions projecting from a surface, opposite the surface carrying the heads, into the slot of the base member, each extension carrying a spigot formation which is biassed by a bias means to project from the extension;

a displacement means for displacing the plate between its operative and inoperative positions, the displacement means comprising a substantially wedge-shaped element which is pivotally mounted about its apex in the enlarged region of the slot of the base member, the wedge-shaped element carrying a pair of spaced roller elements adjacent a wider edge of the wedge-shaped element opposed from the apex thereof, and a pin projecting from a surface of the wedge-shaped element, adjacent the wider edge thereof, opposite the surface which carries the roller elements, through an arcuate aperture in a floor of the slot of the base member, each roller element, in use, being engaged by one of the spigot formations of the plate by a predetermined amount beyond top dead centre to urge the roller element into abutment with a portion of a side wall of the base member defining the slot to lock the plate positively in its operative or inoperative position, as the case may be;

a drive means comprising a motor and gearbox combination for driving the wedge-shaped element through a predetermined arc of travel, the drive means being mounted on a surface of the base member opposite the surface on which the plate is mounted, and the motor and gearbox combination having an output shaft extending through the base member to project into the slot, with the wedge-shaped element being mounted on the output shaft, the axis of the shaft defining the pivotal axis of the wedge-shaped element; and a sensing means comprising a pair of limit switches mounted on the base member on opposed sides of the arcuate aperture, one of the limit switches being engageable by the pin of the wedge-shaped element when the plate is in its operative or inoperative position, as the case may be, the limit switches being electrically connected to the motor of the motor and gearbox combination, to de-activate the motor when the plate is either in its operative or inoperative position.

* * * * *